(12) United States Patent
Liu et al.

(10) Patent No.: US 12,647,596 B2
(45) Date of Patent: Jun. 2, 2026

(54) SYSTEMS AND METHODS FOR CORONARY ROADMAPPING

(71) Applicant: Shanghai United Imaging Intelligence Co., Ltd., Shanghai (CN)

(72) Inventors: Yikang Liu, Cambridge, MA (US);
Zhang Chen, Brookline, MA (US);
Xiao Chen, Lexington, MA (US);
Shanhui Sun, Lexington, MA (US);
Terrence Chen, Lexington, MA (US)

(73) Assignee: Shanghai United Imaging Intelligence Co., Ltd., Shanghai (CN)

( * ) Notice: Subject to any disclaimer, the term of this patent is extended or adjusted under 35 U.S.C. 154(b) by 124 days.

(21) Appl. No.: 18/408,238

(22) Filed: Jan. 9, 2024

(65) Prior Publication Data

US 2025/0227280 A1     Jul. 10, 2025

(51) Int. Cl.
| | |
|---|---|
| *G06T 7/00* | (2017.01) |
| *G06T 7/11* | (2017.01) |
| *G06T 11/60* | (2006.01) |
| *G06V 10/82* | (2022.01) |
| *H04N 19/51* | (2014.01) |

(52) U.S. Cl.
CPC ........... *H04N 19/51* (2014.11); *G06T 7/0012* (2013.01); *G06T 7/11* (2017.01); *G06T 11/60* (2013.01); *G06V 10/82* (2022.01); *G06T 2207/10116* (2013.01); *G06T 2207/30101* (2013.01)

(58) Field of Classification Search
CPC ......... G06T 7/0012; G06T 7/11; G06T 11/60; G06T 2207/10116; G06T 2207/30101; G06V 10/82; H04N 19/51
See application file for complete search history.

(56) References Cited

U.S. PATENT DOCUMENTS

| | | | | |
|---|---|---|---|---|
| 5,131,412 A | * | 7/1992 | Rankin | ................. A61F 5/3761 |
| | | | | 128/877 |
| 5,899,863 A | * | 5/1999 | Hatfield | ................. G03B 42/06 |
| | | | | 600/443 |
| 6,311,085 B1 | * | 10/2001 | Meaney | ........... G01R 33/56383 |
| | | | | 324/306 |

(Continued)

FOREIGN PATENT DOCUMENTS

| | | |
|---|---|---|
| CN | 103002808 A | 3/2013 |
| EP | 2114252 B1 | 11/2009 |
| WO | WO-2022203814 A1 * 9/2022 | ........... G06T 7/0012 |

*Primary Examiner* — Philip P. Dang
(74) *Attorney, Agent, or Firm* — Zhong Law, LLC

(57) ABSTRACT

A method for coronary road mapping may include receiving a current image associated with a medical scan, determining an image that matches the current image from a sequence of images for which respective blood vessel maps have been determined, and overlaying the current image with the blood vessel map associated with the matching image. The sequence of images may be captured when a contrast agent was present, and the matching image may be identified in response to determining that the physiological phase (e.g., cardiac cycle) and/or view depicted by the image match those depicted by the current image. Motion compensation may be performed as part of the blood vessel overlay, which may enable better visualization of blood vessels and medical device(s) (e.g., a catheter) placed in the blood vessels even when the contrast agent is worn out.

18 Claims, 7 Drawing Sheets

(56) References Cited

U.S. PATENT DOCUMENTS

| | | | | |
|---|---|---|---|---|
| 6,488,377 | B2 * | 12/2002 | Matsumoto | A61B 3/145 |
| | | | | 351/206 |
| 7,550,707 | B2 * | 6/2009 | Hashimoto | G06V 10/10 |
| | | | | 250/221 |
| 7,944,498 | B2 * | 5/2011 | Sung | G02B 7/38 |
| | | | | 348/335 |
| 8,204,476 | B2 * | 6/2012 | Morimoto | G06V 40/63 |
| | | | | 382/116 |
| 8,223,199 | B2 * | 7/2012 | Kiyomizu | G06V 40/14 |
| | | | | 348/61 |
| 8,255,037 | B2 | 8/2012 | Florent et al. | |
| 8,280,484 | B2 * | 10/2012 | Boyden | A61B 5/02007 |
| | | | | 600/407 |
| 8,463,003 | B2 * | 6/2013 | Otsubo | G06V 40/1324 |
| | | | | 382/218 |
| 8,488,050 | B2 * | 7/2013 | Ueda | G03B 13/36 |
| | | | | 348/346 |
| 8,724,857 | B2 * | 5/2014 | Derakhshani | G06F 18/2113 |
| | | | | 382/117 |
| 8,731,251 | B2 * | 5/2014 | Rosqvist | G06V 30/1988 |
| | | | | 382/125 |
| 8,798,347 | B2 | 8/2014 | Zhu et al. | |
| 8,811,690 | B2 * | 8/2014 | Dumont | G06V 40/1324 |
| | | | | 359/726 |
| 8,839,720 | B2 * | 9/2014 | Stewart | F42D 1/05 |
| | | | | 102/200 |
| 8,850,535 | B2 * | 9/2014 | Liberman | H04L 63/08 |
| | | | | 713/186 |
| 8,850,536 | B2 * | 9/2014 | Liberman | H04L 9/3231 |
| | | | | 713/186 |
| 8,892,186 | B2 * | 11/2014 | Wu | G06T 7/0014 |
| | | | | 600/424 |
| 8,995,726 | B2 * | 3/2015 | Amano | G06V 40/10 |
| | | | | 600/407 |
| 9,013,271 | B2 * | 4/2015 | Aoki | H04L 9/3231 |
| | | | | 340/5.82 |
| 9,089,602 | B2 * | 7/2015 | Van Wyk | A61K 31/4415 |
| 9,095,308 | B2 | 8/2015 | Florent et al. | |
| 9,100,825 | B2 * | 8/2015 | Schultz | H04W 12/06 |
| 9,208,505 | B1 * | 12/2015 | Zhou | G06Q 30/0227 |
| 9,323,912 | B2 * | 4/2016 | Schultz | G06F 21/32 |
| 9,345,427 | B2 * | 5/2016 | Wood | A61B 5/4839 |
| 9,361,616 | B2 * | 6/2016 | Zhou | G06Q 20/322 |
| 9,408,530 | B2 * | 8/2016 | Ferren | A61B 5/14546 |
| 9,417,188 | B2 * | 8/2016 | Ishihara | A61B 1/000094 |
| 9,553,859 | B2 * | 1/2017 | Slaby | H04L 63/08 |
| 9,588,046 | B2 * | 3/2017 | Ishihara | G01N 21/6456 |
| 9,654,605 | B2 * | 5/2017 | Goldfain | A45C 11/00 |
| 9,672,471 | B2 * | 6/2017 | Boyden | G06N 20/00 |
| 9,772,224 | B2 * | 9/2017 | Ishiguro | G01J 1/44 |
| 9,805,214 | B2 * | 10/2017 | Sahu | H04L 9/3234 |
| 9,811,299 | B2 * | 11/2017 | Nobutani | G06F 3/1204 |
| 9,901,298 | B2 * | 2/2018 | O'Connor | A61B 5/0077 |
| 9,955,900 | B2 * | 5/2018 | O'Connor | A61B 5/1032 |
| 10,002,242 | B2 * | 6/2018 | Jakobsson | G06F 21/32 |
| 10,007,831 | B2 * | 6/2018 | Semba | G06V 40/1365 |
| 10,019,617 | B2 * | 7/2018 | Suzuki | G06V 40/1359 |
| 10,019,619 | B2 * | 7/2018 | Suzuki | G06F 21/32 |
| 10,028,676 | B2 * | 7/2018 | Freeman | G16Z 99/00 |
| 10,121,059 | B2 * | 11/2018 | Yoo | G06V 40/40 |
| 10,194,829 | B2 * | 2/2019 | Kaditz | A61B 5/055 |
| 10,201,425 | B2 * | 2/2019 | Ku | A61F 2/2475 |
| 10,349,886 | B2 * | 7/2019 | Sato | A61B 5/0077 |
| 10,390,754 | B2 * | 8/2019 | Brost | G06F 7/20 |
| 10,973,584 | B2 * | 4/2021 | Grunwald | A61B 34/20 |
| 11,278,214 | B2 * | 3/2022 | Davies | A61B 5/0059 |
| 11,379,994 | B2 * | 7/2022 | Lauritsch | G06T 7/246 |
| 11,464,477 | B2 * | 10/2022 | Al-Noor | A61B 8/461 |
| 11,846,692 | B2 * | 12/2023 | Dou | G01R 33/5608 |
| 12,106,554 | B2 * | 10/2024 | Livet | G06N 3/084 |
| 12,183,004 | B2 * | 12/2024 | Zhao | G06V 10/25 |
| 2007/0038118 | A1 * | 2/2007 | DePue | A61B 5/117 |
| | | | | 600/476 |
| 2008/0005578 | A1 * | 1/2008 | Shafir | G07C 9/37 |
| | | | | 713/186 |
| 2008/0107309 | A1 * | 5/2008 | Cerni | G06V 40/67 |
| | | | | 382/115 |
| 2008/0317293 | A1 * | 12/2008 | Sakurai | G06V 40/145 |
| | | | | 382/115 |
| 2009/0161920 | A1 * | 6/2009 | Kan | G06V 40/1318 |
| | | | | 382/115 |
| 2009/0304237 | A1 * | 12/2009 | Yoshikawa | A61B 5/6826 |
| | | | | 382/116 |
| 2010/0074476 | A1 * | 3/2010 | Aoki | G06V 40/166 |
| | | | | 382/115 |
| 2010/0277314 | A1 * | 11/2010 | Bradley | G07C 1/10 |
| | | | | 340/540 |
| 2012/0162403 | A1 * | 6/2012 | Bae | H04N 7/183 |
| | | | | 348/E7.085 |
| 2012/0194662 | A1 * | 8/2012 | Zhang | G06V 10/143 |
| | | | | 348/E7.085 |
| 2012/0300989 | A1 * | 11/2012 | Nakashima | G06V 40/1324 |
| | | | | 382/115 |
| 2016/0004917 | A1 * | 1/2016 | Yoshida | A61B 90/36 |
| | | | | 382/115 |
| 2017/0011210 | A1 * | 1/2017 | Cheong | A61B 5/681 |
| 2017/0206332 | A1 * | 7/2017 | Piccin | G16H 10/60 |
| 2018/0014734 | A1 * | 1/2018 | Rogers | A61B 5/015 |
| 2018/0045918 | A1 * | 2/2018 | Seo | G02B 9/60 |
| 2019/0095681 | A1 * | 3/2019 | Lee | H04N 23/60 |
| 2020/0222018 | A1 | 7/2020 | Walsum et al. | |
| 2021/0145608 | A1 * | 5/2021 | Herr | A61B 5/004 |
| 2021/0161422 | A1 * | 6/2021 | Chen | A61B 5/055 |
| 2022/0175269 | A1 * | 6/2022 | Lu | A61B 5/6851 |
| 2023/0091196 | A1 * | 3/2023 | Ohyu | G06T 5/92 |
| | | | | 345/592 |

* cited by examiner

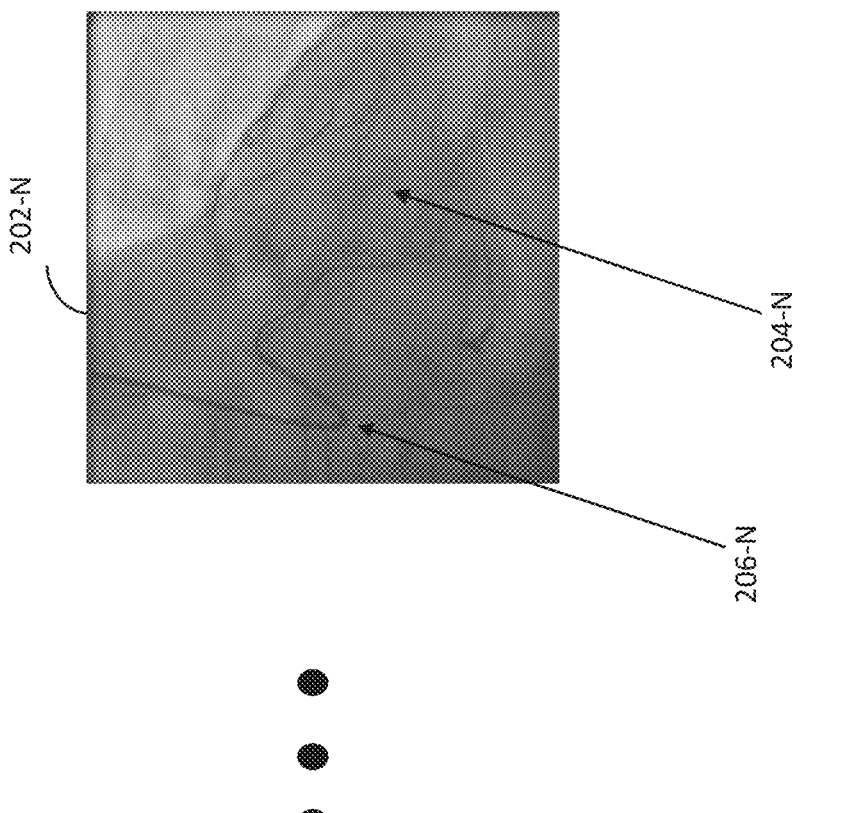
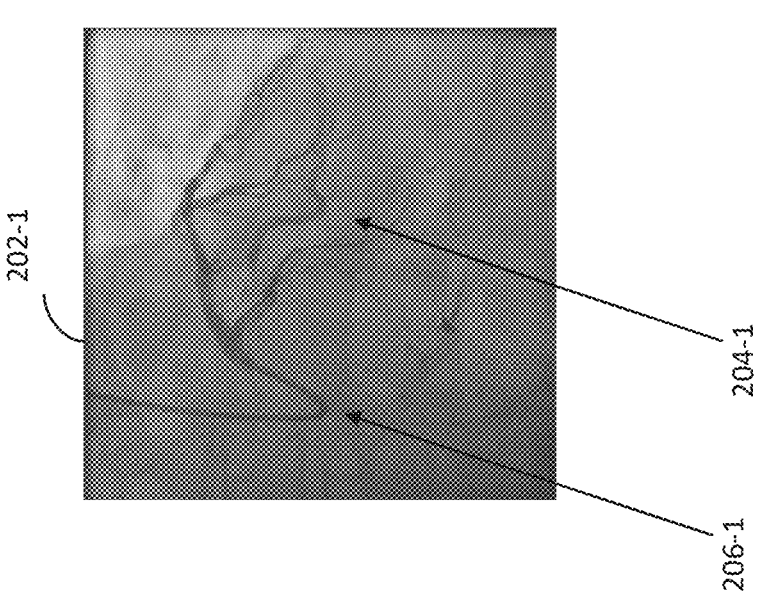
FIG. 2A

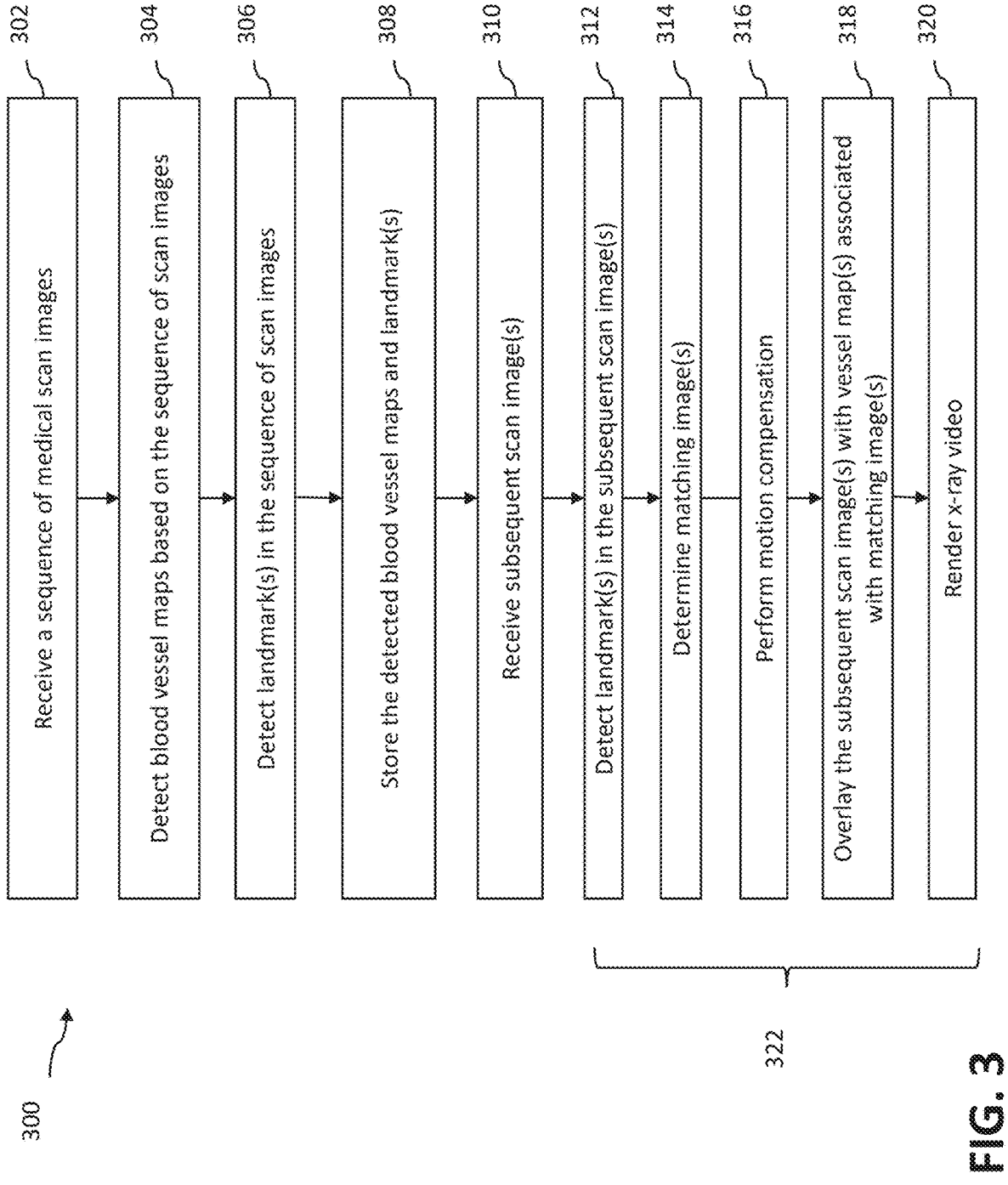

302 — Receive a sequence of medical scan images

304 — Detect blood vessel maps based on the sequence of scan images

306 — Detect landmark(s) in the sequence of scan images

308 — Store the detected blood vessel maps and landmark(s)

310 — Receive subsequent scan image(s)

312 — Detect landmark(s) in the subsequent scan image(s)

314 — Determine matching image(s)

316 — Perform motion compensation

318 — Overlay the subsequent scan image(s) with vessel map(s) associated with matching image(s)

320 — Render x-ray video

SYSTEMS AND METHODS FOR CORONARY ROADMAPPING

BACKGROUND

In many situations, doctors may need to see the blood vessels of a patient on a display while performing a medical procedure. For example, percutaneous coronary intervention (PCI) is a minimally invasive procedure used to open blockage in a coronary artery. During the procedure, a doctor may reach a blocked blood vessel in the heart of a patient by making a small incision in the wrist or upper leg and of the patient and then threading a catheter through an artery that leads to the blockage area. The doctor may use X-ray fluoroscopy as a tool to locate the blockage in the blood vessel and/or to trace the movement of the catheter. A radiopaque contrast agent may be injected into the patient's body to help the doctor better visualize the blood vessel and/or the catheter. Due to its potential harm, however, the use of the contrast agent may be kept at a minimal level or for a short period of time. As a result, the contrast agent may wear off quickly and the doctor may need to mentally overlay a medical scan image (e.g., one without the contrast agent) with a blood vessel map of the patient in order to continue performing a necessary medical procedure. Accordingly, systems and methods that are capable of automatically overlaying a medical image with a matching blood vessel map may be desirable.

SUMMARY

Disclosed herein are systems, methods, and instrumentalities associated with rendering a medical video such as an X-ray fluoroscopy video. According to embodiments of the present disclosure, an apparatus may include one or more processors that are configured to determine respective blood vessel maps associated with a first sequence of medical scan images, wherein the first sequence of medical scan images may be associated with a medical device (e.g., such as a catheter, a guide wire, or a stent) and one or more blood vessels (e.g., such as one or more coronary blood vessels), and wherein each determined vessel map may depict the one or more blood vessels in a corresponding medical scan image. The one or more processors of the apparatus may be further configured to obtain a second medical scan image associated with the medical device and the one or more blood vessels and determine, from the first sequence of medical scan images, a first medical scan image that matches the second medical scan image with respect to at least one of a physiological phase associated with the one or more blood vessels and/or a view of the one or more blood vessels. The one or more processors of the apparatus may then overlay the second medical scan image with the vessel map associated with the first medical scan image, wherein, as a part of the overlaying, the one or more processors may detect, based on a first machine-learning (ML) model, a landmark of the medical device in the first medical scan image and a corresponding landmark of the medical device in the second medical scan image and compensate a motion between the second medical scan image and the vessel map associated with the first medical scan image based at least on the landmark detected in the first medical scan image and the corresponding landmark detected in the second medical scan image.

In embodiments of the present disclosure, the one or more processors of the apparatus may be further configured to determine, for each image of the first sequence of medical scan images and the second medical scan image, a respective view of the one or more blood vessels based on a respective position of a medical scanner used to capture the image, wherein the first medical scan image may be determined to match the second medical scan image based at least on a determination that the view of the one or more blood vessels in the first medical scan image matches the view of the one or more blood vessels in the second medical scan image.

In embodiments of the present disclosure, the one or more processors being configured to determine the respective blood vessel maps associated with the first sequence of medical scan images may comprise the one or more processors being configured to, for each image of the first sequence of medical scan images, determine whether a contrast agent is present in the one or more blood vessels depicted in the image and determine the blood vessel map associated with the image in response to determining that the contrast agent is present in the one or more blood vessels depicted in the image. In embodiments of the present disclosure, as a part of the overlaying described above, the one or more processors may be further configured to compensate a motion of the medical device as depicted in the second medical scan image relative to a position of a medical scanner used to capture the second medical scan image.

In embodiments of the present disclosure, the one or more processors of the apparatus may be further configured to receive a user input that indicates a request to overlay the second medical scan image with the blood vessel map associated with the first medical scan image, and perform the overlaying in response to receiving the user input.

In embodiments of the present disclosure, the one or more processors being configured to determine that the first medical scan image matches the second medical scan image comprises the one or more processors being configured to obtain, using a second ML model, a first segmentation mask for the medical device based on the first medical scan image, obtain, using the second ML model, a second segmentation mask for the medical device based on the second medical scan image, and determine, based on a similarity between the first segmentation mask and the second segmentation mask, that the physiological phase associated with the one or more blood vessels as depicted in the first medical scan image matches the physiological phase associated with the one or more blood vessels as depicted in the second medical scan image. In examples, the one or more processors being configured to determine the similarity between the first segmentation mask and the second segmentation mask comprises the one or more processors being configured to register the first segmentation mask with the second segmentation mask, determine an overlapping area of the first segmentation mask and the second segmentation mask, and determine the similarity between the first segmentation mask and the second segmentation mask based on the overlapping area of the first segmentation mask and the second segmentation mask.

In embodiments of the present disclosure, the one or more processors being configured to determine the blood vessel maps associated with the first sequence of medical scan images comprises the one or more processors being configured to, for each image of the first sequence of medical scan images, determine, using a second ML model, whether the one or more vessels are detected in the image, and determine the blood vessel map associated with the image in response to determining that the one or more blood vessels are detected in the image.

Various embodiments of the present disclosure may be described herein using X-ray images in an X-ray scan as examples. Those skilled in the art will appreciate that the techniques disclosed herein may also be used to provide vessel mapping for other imaging modalities.

BRIEF DESCRIPTION OF THE DRAWINGS

A more detailed understanding of the examples disclosed herein may be had from the following description, given by way of example in conjunction with the accompanying drawing.

FIG. 2A illustrates examples of blood vessel images in which the blood vessels start to fade out in later images due to a contrast agent wearing off.

FIG. 3 is a flow diagram of an example process for coronary roadmapping in accordance with embodiments of the present disclosure.

DETAILED DESCRIPTION

The present disclosure is illustrated by way of example, and not by way of limitation, in the figures of the accompanying drawings.

In some medical procedures, X-ray fluoroscopy may be used to help doctors visualize internal human organs and/or implanted surgical devices. For example, in PCI, X-ray fluoroscopy may allow a doctor to locate a blockage or narrowed area of a blood vessel (e.g., a coronary blood vessel). A radiopaque contrast agent may be injected into the patient's body (e.g., through a catheter) to help the doctor better visualize the blood vessel and/or a medical device inserted into the blood vessel. Due to its potential harmful effects on the patient, however, the contrast agent may be used at a minimal level or only for a short period of time. As a result, after the contrast agent wears off, the doctor may need to mentally overlay an X-ray image showing the medical device with a blood vessel map in order to trace the movement of the medical device in the X-ray image. When referred to herein, a blood vessel map (or simply vessel map) may refer to an image that shows one or more blood vessels.

Overlaying a medical scan image of a medical device obtained without contrast with a blood vessel map obtained with contrast may be challenging due to movements of the medical device and/or the relevant blood vessels. For example, as a patient's heart goes through a cardiac cycle, coronary blood vessels may move with the cardiac cycle. FIG. 2A illustrates an example in which blood vessel 206 and/or a catheter placed inside the blood vessel move from location 206-1 in image frame 202-1 to location 206-2 in image frame 202-N. Such movements of the blood vessel may cause a blood vessel map and an image of the medical device to be mismatched and lead to an inaccurate overlay of the blood vessel map and the image. For example, the position of a blood vessel captured at the isovolumic contraction phase may be different from the position of blood vessel at the isovolumic relaxation phase. As such, if an image of the medical device captured during the isovolumic relaxation phase is overlaid with a blood vessel map determined associated with the isovolumic contraction phase, positional inaccuracy of the medical device with respect to the relevant blood vessels may occur. As another example, the movement of a patient and/or the movement of a medical scanner (e.g., such as an X-ray fluoroscopy imaging system) may also cause a blood vessel map to be incorrectly overlaid with a medical scan image.

Figure 1:
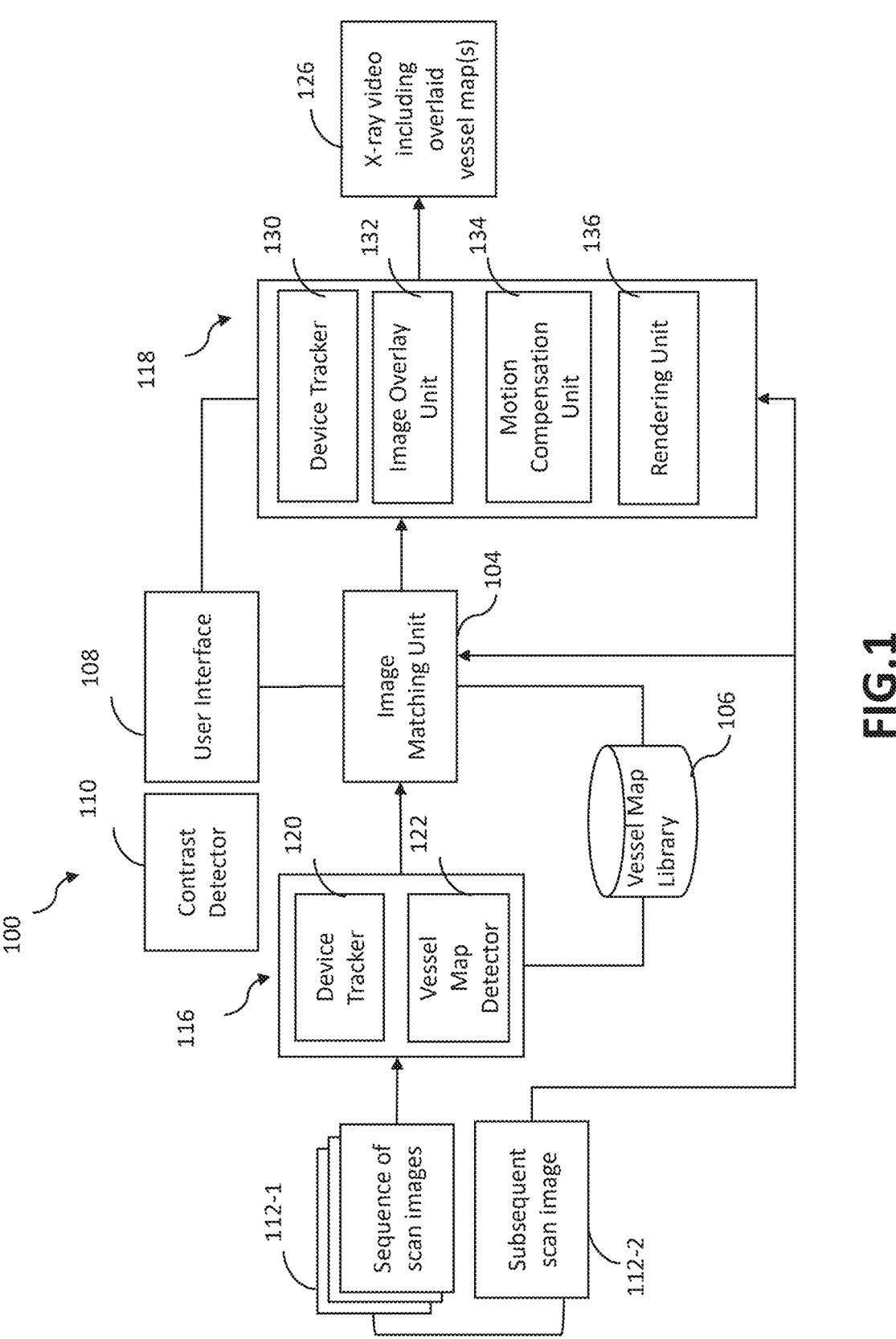
FIG. 1 is a diagram illustrating an example system for overlaying a medical scan image with a blood vessel map in accordance with embodiments of the present disclosure.

Machine-learning based techniques may be used to overcome the challenges described above, and improve the accuracy of coronary roadmapping and/or other medical image processing tasks. FIG. 1 illustrates an example coronary roadmapping system 100 for overlaying a scan image of a medical device (e.g., captured without a contrast agent) with a blood vessel map (e.g., determined with the assistance of the contrast agent). As shown in FIG. 1, the input to system 100 may include a sequence of medical scan images captured using a medical scanner. For example, the one or more medical scan images may include a sequence of medical scan images (e.g., X-ray fluoroscopy images) that depicts a medical device (e.g., a thin tubular structure such as a blood vessel, catheter, guide wire, stent, etc.) and one or more blood vessels located in the vicinity of the medical device. The sequence of medical scan images may form as a medical video (e.g., an X-ray video), which may show the respective positions and/or movements of the medical device and/or the one or more blood vessels.

As shown in FIG. 1, the sequence of medical scan images may include a medical scan image 112-2 captured at a first time position (e.g., a current time) and a sequence of medical scan images 112-1 captured before image 112-2. In examples, the sequence of medical scan images 112-1 may be captured with contrast (e.g., after a contrast agent has been injected into the patient's body), while medical scan image 112-2 may be captured without contrast (e.g., after the contrast agent has worn off). In examples, the sequence of medical scan images 112-1 may be captured during a first physiological cycle (e.g., a cardiac cycle) of the patient, while medical scan image 112-2 may be captured during a second physiological cycle of the patient that may be a repetition of the first physiological cycle. In examples, the sequence of medical scan images 112-1 may provide various views of the medical device and the one or more blood vessels depicted by the sequence of medical scan images (e.g., each view may correspond to a respective position of the medical scanner towards the patient, a zoom factor, and/or a pixel binning), while medical scan image 112-2 may provide the same view of the medical device and the one or more blood vessels provided by one or more of the sequence of medical scan images 112-1 (e.g., (e.g., medical scan image 112-2 may be captured when the medical scanner is at the same position from which the one or more matching images were captured).

Figure 2B:
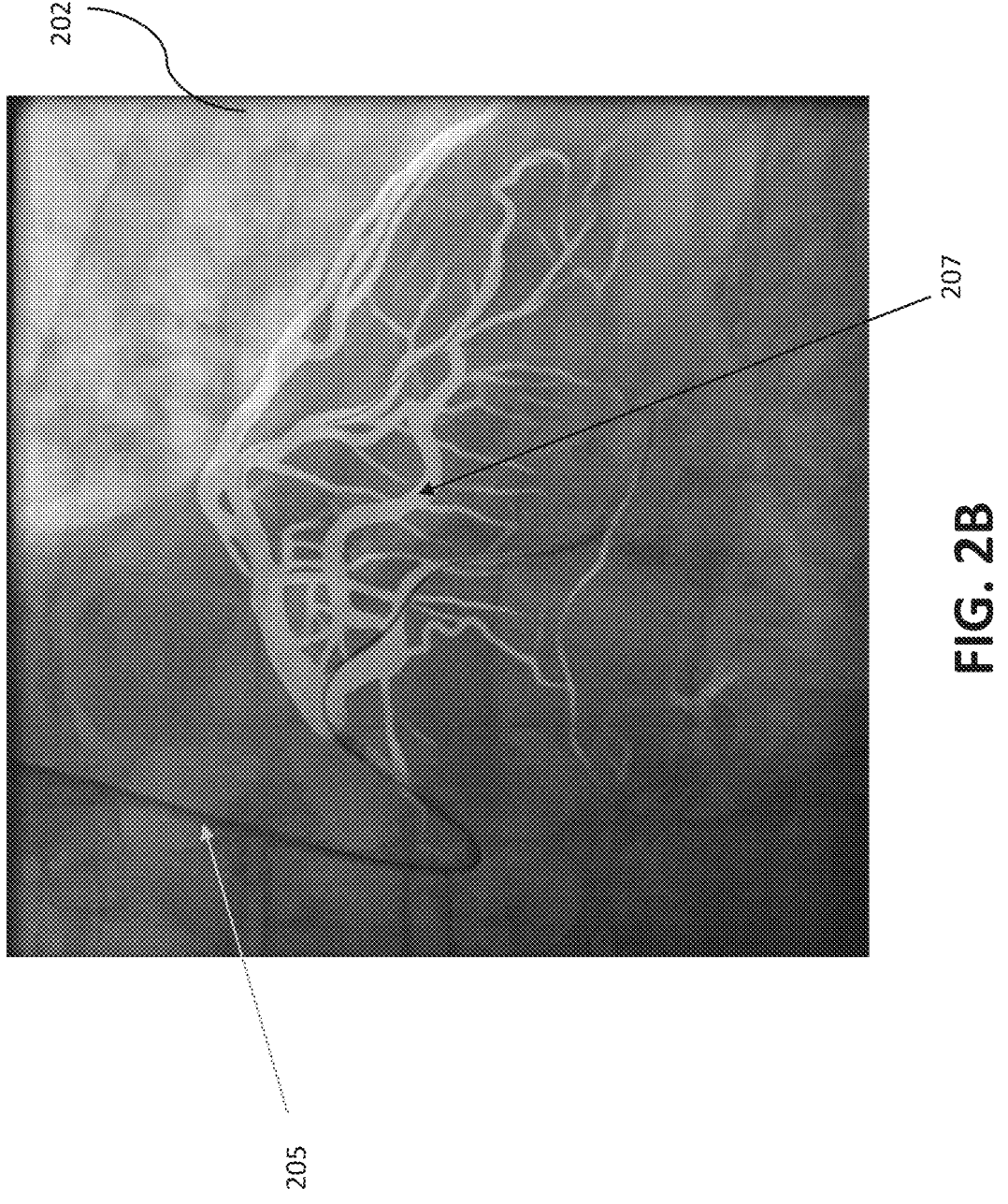
FIG. 2B illustrates an example of an image overlaid with a blood vessel map using the techniques described herein.

System 100 may include multiple functional modules (e.g., 116, 104, 110, and/or 118) configured to determine respective blood vessel maps based on the sequence of medical scan images 112-1 and overlay medical scan image 112-2 with one of the determined blood vessel maps. The operations of system 100 may be controlled in part by a user interface 108 and an output 126 of system 100 may include a rendition of medical scan image 112-2 overlaid with the aforementioned blood vessel map. FIGS. 2A and 2B show examples of input 112 and output 126. For example, FIG. 2A illustrates an example sequence of medical scan images 202-1 . . . 202-N in which one or more blood vessels may start fading out in later scan images as a contrast agent injected into the blood vessels starts to wear off. In some examples, image 202-N may correspond to medical scan image 112-2 in FIG. 1 and images 202-1~202-N−1 may correspond to the sequence of medical scan images 112-1 in FIG. 1. FIG. 2B illustrates image 202N (e.g., depicting a catheter 205) overlaid with a blood vessel map 207 in accordance with embodiments of the present disclosure. The overlaid image may be included in output 126 of FIG. 1 and blood vessel map 207 may be obtained based on the sequence of scan images 112-1 of FIG. 1.

In examples, system 100 may include a vessel map generator 116 configured to generate blood vessel maps from the sequence of medical scan images 112-1 and store the blood vessel maps in a vessel map library 106. As described herein, a blood vessel map may depict one or more blood vessels in a medical image and may be represented in any suitable format. For example, the blood vessel map may include a mask (e.g., a binary segmentation mask) identifying the respective locations, sizes, and/or orientations of the blood vessels in the medical image.

In examples, vessel map generator 116 may include a device tracker 120 and a vessel map detector 122. Device tracker 120 may be configured to detect one or more objects of interest in a medical scan image. The objects of interest may include a medical device, such as, e.g., a catheter, a guide wire, a stent, etc., or a tubular or non-tubular structure of the human body, such as, e.g., a blood vessel (e.g., a coronary artery). In examples, device tracker 120 may be configured to implement a machine learning (ML) trained for detecting landmarks (e.g., one or more keypoints) of the object(s) of interest depicted the medical scan image. For instance, using the ML model, device tracker 120 may detect a tip of a guide wire or a catheter, one or more balloon markers of a stent, etc., that may indicate the location and/or orientation of the object(s) of interest. The ML model may be implemented via an artificial neural network, which may be trained on a training dataset comprising a plurality of training images depicting the object(s) of interest, and annotated data (e.g., ground truth) that indicate the location and/or orientation of the object(s) of interest in the training images. Details of device tracker 120 are further described with respect to FIG. 4.

Still referring to FIG. 1, vessel map detector 122 may be configured to detect a blood vessel map based on a medical scan image (e.g., any of the sequence of medical scan images 112-1). In embodiments, vessel map detector 122 may implement an ML model trained for detecting the blood vessel map from the medical scan image. Similar to the ML model used by device tracker 120, the ML model used by vessel map detector 122 may also be trained on a training dataset that includes a plurality of training images each depicting one or more blood vessels, and annotated data (e.g., ground truth segmentation masks) showing the locations of the blood vessels in the training images.

In examples, as the sequence of medical scan images 112-1 is captured (e.g., with contrast) and processed by system 100, each of the sequence of medical scan images 112-1 may be provided to vessel map generator 116, which may determine a respective blood vessel map based on the medical scan image using vessel map detector 122 (e.g., the determined blood vessel map may be stored in vessel map library 106 and/or be associated with the corresponding medical scan image). It should be noted here that the sequence of medical scan images 112-1 may not all have associated blood vessel maps. For example, if a contrast agent has worn off in some of the medical scan images 112-1, no blood vessels may be detected in those medical scan images and thus no vessel map may be generated based on those medical scan images.

In examples, system 100 may include a contrast detector 110 configured to detect the presence of a contrast agent and/or a level of contrast in the medical scan images 112-1 and/or 112-2. Responsive to determining that the contrast agent is present in the medical scan image (e.g., the level of contrast in the image is above a certain threshold), system 100 may perform vessel map detection using vessel map detector 122. Otherwise, system 100 may not invoke vessel map detector 122 to perform the contrast detection. In examples, contrast detector 110 may be configured to implement an ML model (e.g., a classification model) trained for detecting the presence of the contrast agent in an image or the level of contrast in the image based on features extracted from the image. This ML model may be trained using similar techniques described for the other ML models provided herein. For example, the ML model may be trained on a plurality of training images each depicting regions with contrast, and annotated data (e.g., ground truth classification labels) indicating the presence of the contrast.

Still referring to FIG. 1, device tracker 120 may be configured to detect landmarks (e.g., one or more keypoints) of the object(s) of interest (e.g., a medical device) from the sequence of medical scan images 112-1 and/or store the positions of the detected landmarks (e.g., in vessel map library 106 along with the blood vessel maps). The detected landmarks may be stored in association with the corresponding medical scan image such as the landmarks may be retrieved later on by identifying the corresponding medical scan image. In examples, vessel map generator 116 may additionally store an indication of the view provided by each medical scan image 112-1. Such a view may correspond to (e.g., be indicated by) an angle and/or a position of the medical scanner at the time when the medical scan image is captured. In examples, the angle and/or the position of the medical scanner may be recorded as the medical scan images 112-1 and medical scan image 112-2 were captured and, as such, the information may be readily available when needed.

With further reference to FIG. 1, system 100 may include an image matching unit 104. For a given input image (e.g., medical scan image 112-2, which may be captured without contrast), image matching unit 104 may find a matching image from a set of preceding medical scan images (e.g., sequence of medical scan images 112-1, which may be captured with contrast), and use a blood vessel map associated with the matching image as a candidate with which to overlay the input image. Image matching unit 104 may be configured to determine the matching image for the input image based on one or more matching criteria that may include respective physiological phases (e.g., cardiac phases) associated with the matching image and the input image, and/or respective views provided by the matching image and the input image (e.g., different views may correspond to different viewing angles and/or positions of the medical scanner when the images are captured).

In examples, the matching may be determined based on a physiological phase (e.g., a cardiac phase) of the patient during which the matching image and the input image were captured. Such physiological phase based matching may be performed, for example, by extracting respective features from the input image and the matching image, and determining the respective physiological phases associated with the images based on the extracted features. In examples, image matching unit 104 may be configured to implement an ML model trained for classifying medical scan images into a set of classes predefined based on certain physiological phases of the human body (e.g., cardiac phases such as "Isovolumic relaxation," "Inflow," "Isovolumic contraction," and "Ejection"). Such an ML model may be trained using similar techniques described for the other ML models provided herein. Once trained and given a medical scan image, the ML model may predict a classification label indicating the class of the image and/or a probability score indicating the accuracy of the prediction.

In examples, the physiological phase based matching may be performed by matching the shape of a medical devices as depicted by the images to be matched. For example, an ML model may be trained for obtaining segmentation masks of the medical device based on the pair of images to be matched, and determining the degree of matching between the pair of images based on an overlapping area of the segmentation masks. For instance, the degree of matching between an image in the sequence of medical scan images 112-1 and medical scan 112-2 may be determined by registering the respective segmentation masks of the medical device determined based on the sequence of medical scan images 112-1 with the segmentation mask determined based on medical scan image 112-2, and determining the degree of matching between medical scan image 112-2 and each of the sequence of medical scan images 112-1 based on the size of an overlapping areas of the corresponding segmentation masks (e.g., the bigger the overlapping area, the better the match). Image matching unit 104 may compare the degree of matching between medical scan image 112-2 and each image in the sequence of medical scan images 112-1, and select the image from the sequence of medical scan images 112-1 that has the highest degree of matching with medical scan image 112-2 as the matching image for medical scan image 112-2.

In examples, the matching criteria used by image matching unit 104 may include respective views of the blood vessels and/or medical device depicted by the images to be matched. As described herein, these views may correspond to (e.g., be indicated by) the viewing angles and/or positions of the medical scanner at which the images were captured (e.g., the viewing angle and/or position may be recorded at the time each image is captured). For example, when looking for a match image for medical scan image 112-2, image matching unit 104 may assess the sequence of scan images 112-1 and find an image that was captured at the same (e.g., substantially similar) viewing angle and/or scanner position as medical scan image 112-2. Image matching unit 104 may, for example, compare the respective scanner positions at which the sequence of scan images 112-1 were captured to a scanner position at which scan image 112-2 was captured, and determine a matching image based on the comparison.

In examples, the matching criteria used by image matching unit 104 may include both the physiological phase and the views described herein. For example, image matching unit 104 may determine one or more candidate images from the sequence of scan images 112-1 by matching the views provided by the one or more candidate images with the view provided by scan image 112-2. Subsequently, image matching unit 104 may further select a best matching image from the one or more candidate images by matching the physiological phase (e.g., cardiac phase) associated with that image with the physiological phase associated with scan image 112-2.

With further reference to FIG. 1, system 100 may include a rendering unit 118. In examples, the input to rendering unit 118 may include medical scan image 112-2, which may be captured without contrast, and a blood vessel map associated with an image (e.g., captured with contrast) determined by image matching unit 104 to match medical scan image 112-2. As described herein, the matching image may be from the sequence of medical scan images 112-1 and rendering unit 118 may overlay medical scan image 112-2 with the blood vessel map associated with the matching image so that the position and/or orientation of a medical device depicted in medical scan image 112-2 may be viewed with reference to the blood vessel map (e.g., the output of rendering unit 118 may include the overlaid medical scan image and blood vessel map). In examples, rendering unit 118 may include a device tracker 130, an image overlay unit 132, a motion compensation unit 134, and/or an image render 136. Device tracker 130 may be configured to detect the medical device in medical scan image 112-2, for example, by detecting one or more landmarks (e.g., catheter tip or balloon markers) of the medical device in medical scan image 112-2 (e.g., the landmarks may indicate the location and/or orientation of the medical device). Device tracker 130 may be configured in a similar manner as device tracker 120, which will be further described with respect to FIG. 4.

Motion compensation unit 134 may be configured to determine a motion of the blood vessel map associated with the matching image relative to medical scan image 112-2 and compensate for the motion as part of the overlay operation. Motion compensation unit 134 may be configured to determine the motion, for example, based respective locations of the medical device in medical scan image 112-2 and the matching image. As previously mentioned, the motion may be caused by the heartbeat of the patient. Assuming that the blood vessels and the medical device move together with the heartbeat, the motion compensation may be accomplished by compensating the motion of the medical device between medical scan image 112-2 and the matching image. For instance, the motion of the medical device may be determined by comparing certain detected landmarks of the medical device (e.g., a catheter tip) in medical scan image 112-2 with corresponding landmarks of the medical device in the matching image (e.g., which may be previously stored in vessel map library 106). And once determined, the motion may be compensated using any suitable technique including, for example, rotation and translation.

Additionally, or alternatively, motion compensation unit 134 may determine and compensate a motion of the medical device (together with the patient's heart) relative to the position of the medical scanner used to capture the images of the medical device so that the medical device may have the appearance of being fixated at a specific location of the images (e.g., to stabilize the tip of a catheter in the FOV of a user as the images are played back as a video).

Image overlay unit 132 may be configured to overlay medical scan image 112-2 with the motion compensated blood vessel map (or vice versa) and rendering unit 136 may render the overlaid medical scan image and blood vessel map, as shown in FIG. 2B.

In examples, the modules of system 100 described herein may be used to process a series of images, such as additional images following medical scan image 112-2 in a similar manner. As such, the output of system 100 may include a series of overlaid images, each of which may include a blood vessel map that was generated based on an image captured with contrast. The series of overlaid images may be rendered in an X-ray video. For example, as medical scan images are continuously captured in a medical procedure (e.g., an X-ray fluoroscopy procedure), the images may be continuously overlaid with a blood vessel map and rendered in real-time via an X-ray video. The rendition of the X-ray video may additionally compensate for the movements of blood vessels and/or medical devices from frame to frame (e.g., caused by fast heartbeat), which may interfere with the tracking of the medical device. The movement compensation may be accomplished, for example, by identifying certain anchor positions (e.g., a high-curvature portion of the medical device) in each frame of the X-ray video and fixating those anchor positions in each vide frame.

In examples, system 100 may be configured to provide a user interface 108 that enables a user to determine when to overlay a medical scan image with a blood vessel map. For example, when a contrast agent has worn off, a user may issue a command via user interface 108 indicating that subsequent medical scan images may need to be overlaid with a blood vessel map captured with contrast. The user command may be received via a click of a button, a voice prompt, or any other suitable user interface element. Responsive to receiving the user command, system 100 may invoke the operations described herein for overlaying the medical scan image(s) with the blood vessel map.

In examples, before invoking the overlay operations described herein, in blocks 104 system 100 may check if there are vessel maps from preceding scan images that may be used for the overlay. For example, system 100 may check if any vessel maps are stored in vessel map library 106 and may invoke the operations described herein responsive to determining that the vessel maps are available. If no vessel maps from preceding scan images are stored in vessel map library 106, system 100 may send a notification to the user indicating that no vessel map is available for the overlaid. The notification may be provided via user interface 108 (e.g., via an audio alert, pop-up banner or any other suitable form of notification).

In examples, system 100 may operate in two modes: a vessel map generation mode and a vessel map overlay mode. In the vessel map generation mode, system 100 may process a sequence of captured medical scan images (e.g., with contrast), determine respective blood vessel maps associated with the sequence of medical scan images, and store the blood vessel maps in a library. In the vessel map overlay mode, system 100 may use the previously stored blood vessel maps to generate one or more overlaid medical scan images. System 100 may switch between the vessel map generation mode and the vessel overlay mode based on a user command or automatically. For example, a user command may trigger the switch when the user sees that a contrast agent has worn off. As another example, system 100 may receive a sequence of scan images (e.g., 112-1) and process each of the sequence of images by checking the level of contrast in the image using contrast detector 110. Responsive to determining that the level of contrast exceeds a threshold level, system 100 may operate in the vessel map generation mode to generate and store blood vessel maps based on the sequence of scan images. Responsive to determining that the level of contrast agent has fallen below the threshold level, system 100 may automatically switch to the vessel map overlay mode to overlay scan images with a previously stored vessel map.

FIG. 3 illustrates an example method 300 associated with coronary roadmapping in accordance with embodiments of the present disclosure. Method 300 may be implemented in system 100 of FIG. 1 and may start with receiving a sequence of medical scan images (e.g., the sequence of medical scan images 112-1 of FIG. 1) associated with a medical device and one or more blood vessels at 302, followed by determining respective blood vessel maps based on the sequence of medical scan images at 304. In some examples, method 300 may further include detecting, at 306, one or more landmarks of the medical device in each of the sequence of medical scan images and storing the detected vessel maps and landmark(s) (e.g., in a vessel map library) at 308. In examples, the operations at 304, 306, and 308 may be executed in conjunction with other operations such as those associated with contrast detector 110 of FIG. 1 for detecting the presence of a contrast agent in each medical scan image and/or whether to determine a vessel map based on the medical scan image. The other operations may also include determining and storing information regarding the view provided by each medical scan image (e.g., as indicated by the viewing angle and/or position of the medical scanner used to capture the medical scan image).

As shown in FIG. 3, method 300 may further include receiving one or more additional medical scan images (e.g., medical scan image 112-2 of FIG. 1) captured without contrast (e.g., after the contrast agent has worn off). For each such image, method 300 may include overlaying the image with a previously determined blood vessel map at 322, which in turn may include operations 312, 314, 316, 318 and 320 depicted by FIG. 3. The operation at 312 may be implemented by device tracker 130 and related to detecting one or more landmarks (e.g., one or more keypoints) of the medical device in the medical scan image. The operation at 314 may be implemented by image matching unit 104 and related to determining a matching image from the sequence of medical scan images captured with contrast. For example, the matching image may be determined from the sequence of scan images based on a physiological phase, a view (e.g., as indicated by a viewing angle and/or position of the medical scanner), or a combination thereof.

The operation at 316 may be implemented in motion compensation unit 134 and related to compensating the motion between the subsequent medical scan image and the matching medical scan image. For example, the operation at 316 may include compensating a motion of the subsequent medical scan image from the matching image based at least in part on the detected landmarks of the medical device in the subsequent medical scan image and corresponding landmarks of the medical device in the matching image. Additionally, or alternatively, the operation at 316 may include compensating a motion of the medical device relative to the position of the medical scanner at which each medical scan image is captured.

The operation at 318 may be implemented by image overlay unit 132 and related to overlaying the subsequent scan image (e.g., image 112-2 of FIG. 1) with the blood vessel map associated with the matching image. The operation at 320 may be implemented by rendering unit 136 and related to overlaying additional medical scan images with respective blood vessel maps and rendering the overlaid images in an X-ray video.

When implemented in system 100, method 300 may also facilitate the system to operate in different modes, such as a vessel map generation mode and a vessel map overlay mode, as described above. For example, the operations at 302-308 may be performed in the vessel map generation mode and, upon receiving an image in the X-ray video, the operations may switch to the vessel map overlay mode (manually or automatically) as described above with respect to system 100). Following the switching, the operations at 312-320 may be performed.

Although various operations of method 300 are described in a particular order, it is appreciated that the order of these operations may vary, and such variation is within the scope of the disclosure. For example, the operations at 316 and 318 may be performed in a different order, under which the image overlay may be performed before the motion compensation.

Figure 4:
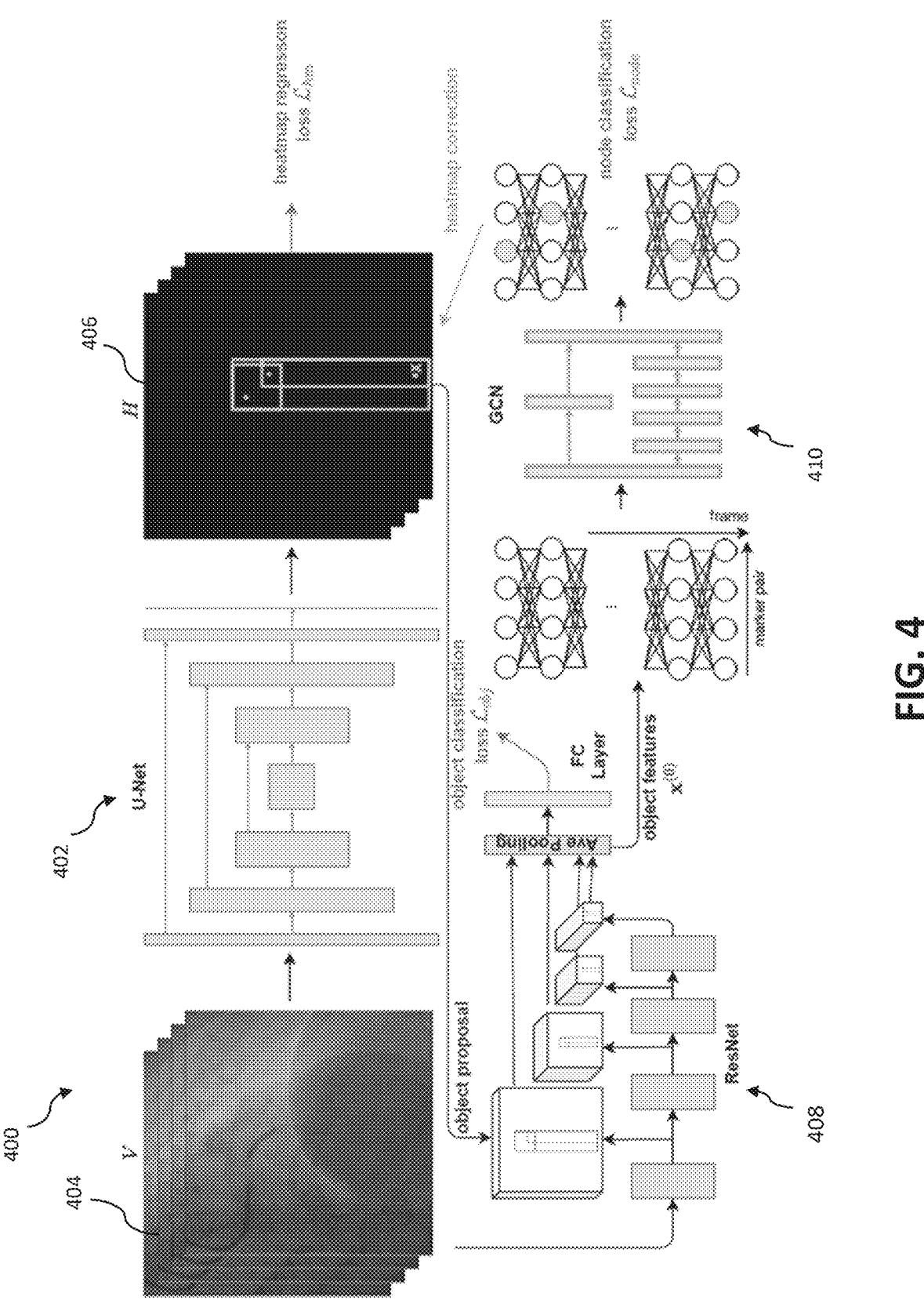
FIG. 4 is a diagram illustrating an example system for detecting and tracking one or more objects in a medical image in accordance with some embodiments of the disclosure provided herein.

FIG. 4 illustrates an example of a neural network based system 400 for detecting and/or tracking a medical device (e.g., a catheter, a stent, etc.) in one or more medical scan images (e.g., medical scan images 112-1 and 112-2 in FIG. 1) in accordance with embodiments of the present disclosure. System 400 will be described herein using a stent as an example medical device, but those skilled in the art will appreciate that the embodiments described with respect to FIG. 4 can be applied to any type of medical devices.

As shown in FIG. 4, system 400 may include a machine learning model 402 configured to detect the medical device in medical scan images (e.g., an X-ray video) 404 and generate an output 406 indicating the detected medical device. In some examples, the machine learning model 402 may include a neural network such as a convolutional neural network (CNN) arranged in a U-Net architecture. Machine learning model 402 may be configured to detect one or more markers on the medical device (e.g., stent balloon markers) and, as such, the detected medical device may be represented by the detected markers (e.g., a landmark pair containing the two balloon markers of the stent). As shown in FIG. 4, the output of the machine learning model 402 may include a plurality of predicted heatmaps each containing the detected medical device in a respective image frame. Thus, as the input X-ray video V∈RT×H×W×C 404 is provided to the machine learning model 402, heatmaps H∈RT×H×W 406 may be generated, wherein the peak points in each heatmap may indicate the locations of candidate markers (e.g., represented as 2D coordinates).

In examples, system 400 may further include one or more additional neural networks configured to refine and/or track the medical device detected by neural network 404. For example, a residual neural network (ResNet) 408 may be used to extract features associated with candidate medical device, each of which may be represented by a bounding box based on the detected marker(s) described above. In examples (e.g., when tracking catheter tips), ResNet 408 may be configured to extract image features by cropping patches from a feature map, where the patches may be centered around candidate catheter tip locations. The outputs of ResNet 408 at multiple scales or levels within corresponding bounding boxes (of the same medical device) may be averaged and stored in a multi-dimension (e.g., D dimensions) feature vector x(0)∈RD for each candidate medical device, and the feature vectors may be provided to a graph neural network (GNN) such as a graph convolutional neural network (GCN) 410 to determine the temporal relationship of the detected medical device from frame to frame. For instance, via GCN 410, the temporal relationship of the detected medical device in X-ray video 404 may be represented using a graph. The nodes of the graph may represent encoded features of candidate medical device obtained from marker detection and the edges (e.g., connecting two nodes) of the graph may represent the temporal coherency of the candidate medical device between frames. GCN 410 may be trained as a node classification model to update both node and edge features via message passing, and medical device tracking may be achieved by learning both context and temporal information through the training. For example, node classification using the GCN 410 may identify one or multiple tracked medical devices in different image frames as the positive nodes of a corresponding class, whereas false positives of the detected medical devices and/or untracked medical devices may be classified as negative nodes.

In some examples, GCN 410 may update the features of candidate medical devices in a frame based on similar medical devices from adjacent frames and a sequence of convolution layers may enable information propagation from frames that are further away. It is recognized that the feature update may be susceptible to noisy neighborhood (e.g., if a target medical device is missed during medical device detection in an upstream frame, such errors may propagate to nearby frames). Accordingly, GCN 410 may include a parallel fully connected (FC) bypass, in which all of the node features may be updated independently without influence from other connected nodes. In some examples, the results of GCN 410 may be used to correct heatmaps 406 and thus refine the detected medical devices in X-ray video 404.

In some examples, data that indicate a detected medical device in an image may include a respective location, orientation, and/or deformation of the medical device, which may be determined based on the marker locations described herein. In some examples, a detected medical device (e.g., such as a catheter or a guide wire) may not have apparent markers and system 400 may be configured to determine respective centroids of the medical device in multiple image frames and a deformation field that indicates a displacement (e.g., pixelwise displacement) of the medical device from one image frame to another when the images are aligned based on the respective centroids of the medical device in those images. The centroid detection may be performed using a neural network trained with annotated data, while the deformation field prediction may be performed using a neural network trained in an unsupervised or self-supervised manner (e.g., by minimizing a difference between an image depicting a deformed medical device obtained using the deformation field and an actual reference image that depicts the deformed medical device).

Figure 5:
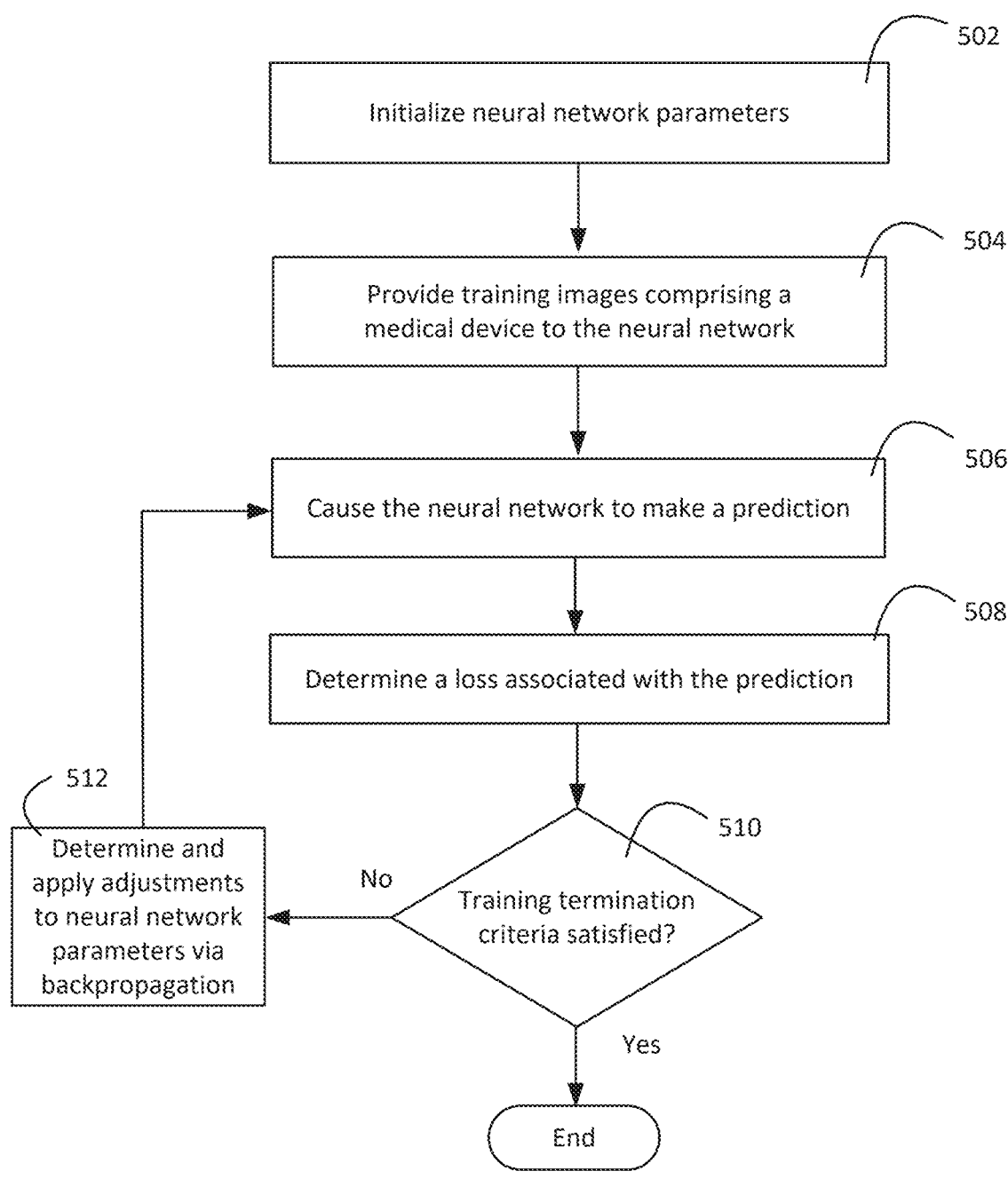
FIG. 5 is a flow diagram illustrating an example process for training a machine learning model to perform one or more of the tasks described herein.

FIG. 5 illustrates example operations associated with training a neural network (e.g., a machine learning model) to perform one or more of the tasks described herein. As shown in FIG. 5, the training operations may include initializing the parameters of the neural network (e.g., weights associated with the various filters or kernels of the neural network) at 502. The parameters may be initialized, for example, based on samples collected from one or more probability distributions or parameter values of another neural network having a similar architecture. The training operations may further include providing a training image comprising a medical device (e.g., a catheter, a stent, etc.) and/or one or more blood vessels to the neural network at 504, and causing the neural network to make a prediction (e.g., a segmentation mask, a classification label, the location of a landmark of the medical device, etc.) at 506. At 508, a loss between the prediction and a desired result (e.g., ground truth) may be determined using one or more suitable loss functions and the loss may be evaluated at 510 to determine whether one or more training termination criteria have been satisfied. For instance, a training termination criterion may be deemed satisfied if the loss(es) described above is below a predetermined threshold, if a change in the loss(es) between two training iterations (e.g., between consecutive training iterations) falls below a predetermined threshold, etc. If the determination at 510 is that the training termination criterion has been satisfied, the training may end. Otherwise, the loss may be backpropagated (e.g., based on a gradient descent associated with the loss) through the neural network at 512 before the training returns to 506.

For simplicity of explanation, the training steps are depicted in FIG. 5 and described herein with a specific order. It should be appreciated, however, that the training operations may occur in various orders, concurrently, and/or with other operations not presented or described herein. Furthermore, it should be noted that not all operations that may be included in the training process are depicted and described herein, and not all illustrated operations are required to be performed.

Figure 6:
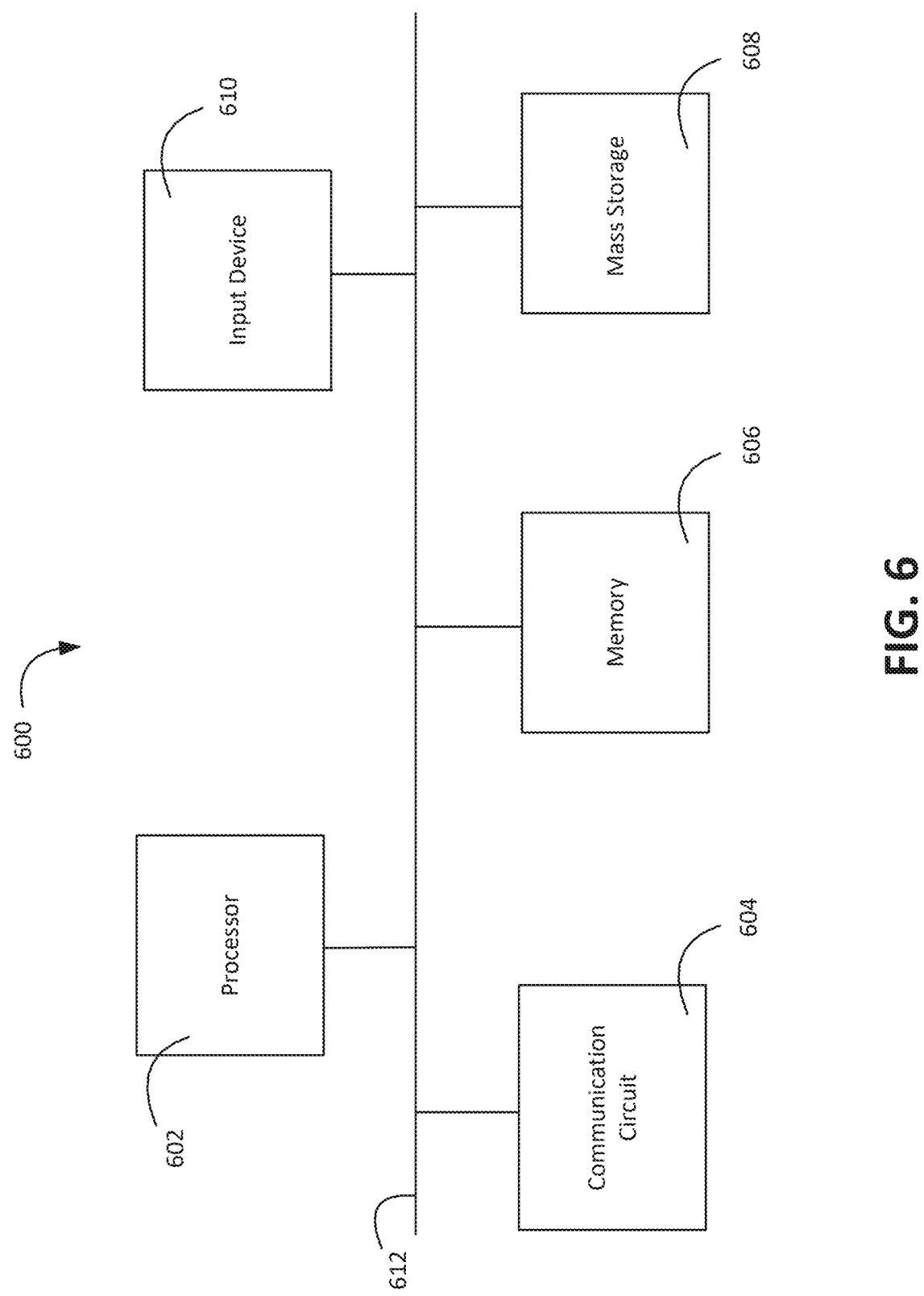
FIG. 6 is a block diagram illustrating example components of an apparatus that may be configured to perform the tasks described herein.

The systems, methods, and/or instrumentalities described herein may be implemented using one or more processors, one or more storage devices, and/or other suitable accessory devices such as display devices, communication devices, input/output devices, etc. FIG. 6 is a block diagram illustrating an example apparatus 600 that may be configured to perform one or more of the tasks described herein. As shown, apparatus 600 may include a processor (e.g., one or more processors) 602, which may be a central processing unit (CPU), a graphics processing unit (GPU), a microcontroller, a reduced instruction set computer (RISC) processor, application specific integrated circuits (ASICs), an application-specific instruction-set processor (ASIP), a physics processing unit (PPU), a digital signal processor (DSP), a field programmable gate array (FPGA), or any other circuit or processor capable of executing the functions described herein. Apparatus 600 may further include a communication circuit 604, a memory 606, a mass storage device 608, an input device 610, and/or a communication link 612 (e.g., a communication bus) over which the one or more components shown in the figure may exchange information.

Communication circuit 604 may be configured to transmit and receive information utilizing one or more communication protocols (e.g., TCP/IP) and one or more communication networks including a local area network (LAN), a wide area network (WAN), the Internet, a wireless data network (e.g., a Wi-Fi, 3G, 4G/LTE, or 5G network). Memory 606 may include a storage medium (e.g., a non-transitory storage medium) configured to store machine-readable instructions that, when executed, cause processor 602 to perform one or more of the functions described herein. Examples of the machine-readable medium may include volatile or non-volatile memory including but not limited to semiconductor memory (e.g., electrically programmable read-only memory (EPROM), electrically erasable programmable read-only memory (EEPROM)), flash memory, and/or the like. Mass storage device 608 may include one or more magnetic disks such as one or more internal hard disks, one or more removable disks, one or more magneto-optical disks, one or more CD-ROM or DVD-ROM disks, etc., on which instructions and/or data may be stored to facilitate the operation of processor 602. Input device 610 may include a keyboard, a mouse, a voice-controlled input device, a touch sensitive input device (e.g., a touch screen), and/or the like for receiving user inputs to apparatus 600.

It should be noted that apparatus 600 may operate as a standalone device or may be connected (e.g., networked, or clustered) with other computation devices to perform the functions described herein. And even though only one instance of each component is shown in FIG. 6, a skilled person in the art will understand that apparatus 600 may include multiple instances of one or more of the components shown in the figure.

Various embodiments described herein provide advantages over conventional medical imaging systems in that vessel maps in contrast agent-free medical image, e.g., X-ray fluoroscopic image, can be overlaid accurately and rendered in an X-ray video. This results in more accurately overlaid vessel maps and improved visualization of vessels, enabling the doctors to visualize the vessels while performing medical procedures. Further, various machine learning models are used to improve the accuracy of various tasks under low contrast and noisy medical images associated with X-ray, such as contrast agent detection, device tracking, vessel map detection, and medical device mask detection can also be achieved.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and variations are also possible without departing from the spirit and scope of this disclosure. In addition, unless specifically stated otherwise, discussions utilizing terms such as "analyzing," "determining," "enabling," "identifying," "modifying" or the like, refer to the actions and processes of a computer system, or similar electronic computing device, that manipulates and transforms data represented as physical (e.g., electronic) quantities within the computer system's registers and memories into other data represented as physical quantities within the computer system memories or other such information storage, transmission or display devices.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. An apparatus comprising one or more processors, wherein the one or more processors are configured to:
   determine respective blood vessel maps associated with a first sequence of medical scan images, wherein the first sequence of medical scan images is associated with one or more blood vessels and a medical device inserted into at least one of the one or more blood vessels, and wherein each blood vessel map depicts the one or more blood vessels in a corresponding medical scan image;
   obtain a second medical scan image associated with the medical device and the one or more blood vessels;
   determine, from the first sequence of medical scan images, a first medical scan image that matches the second medical scan image with respect to at least a cardiac phase associated with the one or more blood vessels, wherein, as a part of the determination, the one or more processors are configured to:
   extract respective image features from the first medical scan image and the second medical scan image; and
   determine, based on the extracted image features, that a first cardiac phase associated with the one or more blood vessels in the first medical scan image matches a second cardiac phase associated with the one or more blood vessels in the second medical scan image; and
   overlay the second medical scan image with the blood vessel map associated with the first medical scan image, wherein, as a part of the overlaying, the one or more processors are configured to:

detect, based on a machine-learning (ML) model, a landmark of the medical device in the first medical scan image and a corresponding landmark of the medical device in the second medical scan image; and adjust at least one of the second medical scan image or the blood vessel map associated with the first medical scan image to compensate for a motion between the second medical scan image and the blood vessel map associated with the first medical scan image, wherein the adjustment is made based at least on a movement of the landmark detected in the first medical scan image compared to the corresponding landmark detected in the second medical scan image.

2. The apparatus of claim 1, wherein the one or more processors are further configured to determine, for each image of the first sequence of medical scan images and the second medical scan image, a respective view of the one or more blood vessels based on a respective position of a medical scanner used to capture the image, and wherein the first medical scan image is determined to match the second medical scan image further based on a determination that the view of the one or more blood vessels in the first medical scan image matches the view of the one or more blood vessels in the second medical scan image.

3. The apparatus of claim 1, wherein the one or more processors being configured to determine the respective blood vessel maps associated with the first sequence of medical scan images comprises the one or more processors being configured to:

for each image of the first sequence of medical scan images:

determine whether a contrast agent is present in the one or more blood vessels depicted in the image; and determine the blood vessel map associated with the image in response to determining that the contrast agent is present in the one or more blood vessels depicted in the image.

4. The apparatus of claim 1, wherein, as a part of the overlaying, the one or more processors are further configured to adjust the at least one of the second medical scan image or the blood vessel map associated with the first medical scan image to compensate for a motion of the medical device as depicted in the second medical scan image relative to a position of a medical scanner used to capture the second medical scan image.

5. The apparatus of claim 1, wherein the one or more processors being configured to determine that the first medical scan image matches the second medical scan image comprises the one or more processors being configured to:

obtain a first heatmap indicating the medical device based on the first medical scan image;

obtain a second heatmap indicating the medical device based on the second medical scan image; and determine, based on a similarity between the first heatmap and the second heatmap, that the first cardiac phase associated with the one or more blood vessels as depicted in the first medical scan image matches the second cardiac phase associated with the one or more blood vessels as depicted in the second medical scan image.

6. The apparatus of claim 5, wherein the one or more processors being configured to determine the similarity between the first heatmap and the second heatmap comprises the one or more processors being configured to:

register the first heatmap with the second heatmap;

determine an overlapping area of the first heatmap and the second heatmap; and determine the similarity between the first heatmap and the second heatmap based on the overlapping area of the first heatmap and the second heatmap.

7. The apparatus of claim 1, wherein the one or more processors being configured to overlay the second medical scan image with the blood vessel map associated with the first medical scan image comprises the one or more processors being configured to fixate the detected landmark of the medical device at a specific location of the second medical scan image overlaid with the blood vessel map.

8. The apparatus of claim 1, wherein the one or more processors being configured to determine the blood vessel maps associated with the first sequence of medical scan images comprises the one or more processors being configured to:

for each image of the first sequence of medical scan images:

determine, using a vessel map detector, whether the one or more blood vessels are detected in the image; and determine the blood vessel map associated with the image in response to determining that the one or more blood vessels are detected in the image.

9. The apparatus of claim 1, wherein the medical device comprises a catheter, a guide wire, or a stent, and wherein the first medical scan image and the second medical scan image each comprises an X-ray scan image.

10. A method implemented by a computing device, the method comprising:

determining respective blood vessel maps associated with a first sequence of medical scan images, wherein the first sequence of medical scan images is associated with one or more blood vessels and a medical device inserted into at least one of the one or more blood vessels, and wherein each blood vessel map depicts the one or more blood vessels in a corresponding medical scan image, obtaining a second medical scan image associated with the medical device and the one or more blood vessels;

determining, from the first sequence of medical scan images, a first medical scan image that matches the second medical scan image with respect to at least a cardiac phase associated with the one or more blood vessels, wherein the determining comprises:

extracting respective image features from the first medical scan image and the second medical scan image; and determining, based on the extracted image features, that a first cardiac phase associated with the one or more blood vessels in the first medical scan image matches a second cardiac phase associated with the one or more blood vessels in the second medical scan image; and overlaying the second medical scan image with the blood vessel map associated with the first medical scan image, wherein the overlaying comprises:

detecting, based on a machine-learning (ML) model, a landmark of the medical device in the first medical scan image and a corresponding landmark of the medical device in the second medical scan image; and adjusting at least one of the second medical scan image or the blood vessel map associated with the first medical scan image to compensate for a motion between the second medical scan image and the blood vessel map associated with the first medical scan image, wherein the adjustment is made based at least on a movement of the landmark detected in the first medical scan image compared to the corresponding landmark detected in the second medical scan image.

11. The method of claim 10, further comprising, for each image of the first sequence of medical scan images and the second medical scan image, determining a respective view of the one or more blood vessels based on a respective position of a medical scanner used to capture the image, wherein the first medical scan image is determined to match the second medical scan image further based on a determination that the view of the one or more blood vessels in the first medical scan image matches the view of the one or more blood vessels in the second medical scan image.

12. The method of claim 10, wherein determining the respective blood vessel maps associated with the first sequence of medical scan images comprises, for each image of the first sequence of medical scan images, determining whether a contrast agent is present in the one or more blood vessels depicted in the image and determining the blood vessel map associated with the image in response to determining that the contrast agent is present in the one or more blood vessels depicted in the image.

13. The method of claim 10, wherein overlaying the second medical scan image with the blood vessel map associated with the first medical scan image further comprises adjusting at least one of the second medical scan image or the blood vessel map associated with the first medical scan image to compensate for a motion of the medical device as depicted in the second medical scan image relative to a position of a medical scanner used to capture the second medical scan image.

14. The method of claim 10, wherein determining that the first medical scan image matches the second medical scan image comprises:

obtaining a first heatmap indicating the medical device based on the first medical scan image and a second heatmap indicating the medical device based on the second medical scan image; and determining, based on a similarity between the first heatmap and the second heatmap, that the first cardiac phase associated with the one or more blood vessels as depicted in the first medical scan image matches the second cardiac phase associated with the one or more blood vessels as depicted in the second medical scan image.

15. The method of claim 14, wherein determining the similarity between the first heatmap and the second heatmap comprises:

registering the first heatmap with the second heatmap;

determining an overlapping area of the first heatmap and the second heatmap; and determining the similarity between the first heatmap and the second heatmap based on the overlapping area of the first heatmap and the second heatmap.

16. The method of claim 10, wherein overlaying the second medical scan image with the blood vessel map associated with the first medical scan image comprises fixating the detected landmark of the medical device at a specific location of the second medical scan image overlaid with the blood vessel map.

17. The method of claim 10, wherein the medical device comprises a catheter, a guide wire, or a stent, and wherein the first medical scan image and the second medical scan image each comprises an X-ray scan image.

18. A non-transitory computer readable medium comprising program instructions that, when executed by one or more processors, cause the one or more processors to perform a method that comprises:

determining respective blood vessel maps associated with a first sequence of medical scan images, wherein the first sequence of medical scan images is associated with one or more blood vessels and a medical device inserted into at least one of the one or more blood vessels, and wherein each determined blood vessel map depicts the one or more blood vessels in a corresponding medical scan image;

obtaining a second medical scan image associated with the medical device and the one or more blood vessels;

determining, from the first sequence of medical scan images, a first medical scan image that matches the second medical scan image with respect to at least a cardiac phase associated with the one or more blood vessels, wherein the determining comprises:

extracting respective image features from the first medical scan image and the second medical scan image; and determining based on the extracted image features, that a first cardiac phase associated with the one or more blood vessels in the first medical scan image matches a second cardiac phase associated with the one or more blood vessels in the second medical scan image; and overlaying the second medical scan image with the blood vessel map associated with the first medical scan image, wherein the overlaying comprises:

detecting, based on a machine-learning (ML) model, a landmark of the medical device in the first medical scan image and a corresponding landmark of the medical device in the second medical scan image; and adjusting at least one of the second medical scan image or the blood vessel map associated with the first medical scan image to compensate for a motion between the second medical scan image and the blood vessel map associated with the first medical scan image, wherein the adjustment is made based at least on a movement of the landmark detected in the first medical scan image compared to the corresponding landmark detected in the second medical scan image.

* * * * *